United States Patent [19]
Smith, Jr. et al.

[11] Patent Number: 5,082,721
[45] Date of Patent: Jan. 21, 1992

[54] FABRICS FOR PROTECTIVE GARMENT OR COVER

[76] Inventors: W. Novis Smith, Jr., 412 South Perth Street; Peter Holemans, 3204 Summer Street, both of Philadelphia, Pa.

[21] Appl. No.: 567,972

[22] Filed: Aug. 15, 1990

Related U.S. Application Data

[63] Continuation-in-part of Ser. No. 311,284, Feb. 16, 1989, Pat. No. 4,970,105.

[51] Int. Cl.⁵ .............................................. B32B 7/00
[52] U.S. Cl. .................................... 428/252; 2/81; 428/246; 428/253; 428/280; 428/282; 428/284; 428/287; 428/296; 428/421; 428/422; 428/902
[58] Field of Search ............... 428/246, 252, 253, 280, 428/282, 284, 287, 296, 421, 422, 902; 2/81

[56] References Cited

U.S. PATENT DOCUMENTS

| | | | |
|---|---|---|---|
| 2,840,881 | 7/1958 | Bateman | 428/280 |
| 4,799,346 | 1/1989 | Bolton et al. | 428/441 |
| 4,895,751 | 1/1990 | Kato et al. | 428/422 |
| 4,943,475 | 7/1990 | Bakes et al. | 428/422 |
| 4,954,388 | 9/1990 | Mallouk et al. | 428/422 |
| 4,970,105 | 11/1990 | Smith | 428/197 |

Primary Examiner—James J. Bell
Attorney, Agent, or Firm—John Lezdey

[57] ABSTRACT

The invention provides a fabric for use in the manufacture of protective garments, containers and covers comprising an inner layer of an tear resistant fabric of high tensile fibers, a film layer bonded on the top surface of said tear resistant fabric comprising a meltable polyhalogenated resin and a film layer of an ethylene-vinyl alcohol copolymer bonded on the bottom surface of the tear resistant fabric.

14 Claims, 1 Drawing Sheet

FABRICS FOR PROTECTIVE GARMENT OR COVER

RELATED APPLICATION

This application is a continuation-in-part of application Ser. No. 311,284, filed Feb. 16, 1989, now U.S. Pat. No. 4,970,105, of W. Novis Smith et al entitled "Fabrics for Protective Garment Or Cover."

FIELD OF INVENTION

The present invention relates to laminate fabrics for protective garments and covers for use in hazardous environments. More particularly, the invention is concerned with lightweight protective garments, containers and covers comprising a high tensile strength film or fabric which is bonded between a film comprising an outside layer of a fusible or a meltable polyhalogenated hydrocarbon and an inside layer comprising the copolymer of ethylene and vinyl alcohol.

BACKGROUND OF THE INVENTION

Protective clothing of many types is now well known for many and varied uses, such as suits for industrial workers, firemen, forest fire fighters, race car drivers, airplane pilots, and suits for use by military personnel, for protection from fire, vapors and harmful substances. Garments include not only complete, hermetic suits, but also individual garments such as trousers, jackets, gloves, boots, hats, head coverings, masks, etc.

Regulations restricting exposure to hazardous environments of various kinds, such as the Occupational Safety and Health Act, make it increasingly necessary to have better and more effective kinds of protective garments. In particular, certain requirements by the U.S. Coast Guard and related requirements by other U.S. government or organizations involve a total protective hermetic suit or envelope around the individual person or fireman. These situations involve cleaning up chemical spills or for fighting chemical fires where the chemical materials are unknown and presumed toxic.

The need for such encapsulating suits is for "immediately dangerous to life and health (IDLH)" environments. These suits must be air tight and worn with a self-contained breathing apparatus. The suit must be nonabsorbent, totally impermeable, and resistant to the widest range of chemicals and reagents. It should also be as fire resistant as possible. Since these suits are being worn by actively working individuals, they should also be flexible, abrasion resistant, lightweight, and should maintain their impermeability while being used.

Such garments presently available are almost invariably of thick construction and heavy in weight, and are often fabricated at least in part from materials impermeable to water or water vapor, such as natural and synthetic rubbers and elastomers, chlorinated rubbers, etc.

Protective clothing comprised of laminates of films have the problem of forming "kinks" when bent so as to restrict movement and become cumbersome. Moreover, some of the protective clothing are porous and provide little protection against hazardous chemical vapors.

It is therefore desirable to provide a fabric which, in addition to being flame retardant, also possesses good abrasion resistance, flexibility, heat sealing properties, and is resistant to a large range of chemicals.

U.S. Pat. No. 4,569,088, to Frankenburg et al describes a protective garment for protection from high temperatures and occasional splashes of molten metal. The fabric comprises an inner fabric layer of a fibrous polyamide and surface layers of polytetrafluoroethylene fibers. However, the fabric is porous and does not provide any protection against hazardous vapors.

U.S. Pat. No. 2,840,881, describes fibrous structures comprised of a surface layer of non-woven, intermingled polytetrafluoroethylene fibers and another layer of fibers other than polytetrafluoroethylene fibers. The structures are useful when a lubricating surface is required.

In order to maximize the impermeability of the fabric against all chemical substances and vapors, the outer plastic films used must be composed of a fusible or meltable polyhalogenated polymer. Additionally, the film itself must be without pin holes, fibers or porosity which lessen the barrier resistance of the actual film. Laminating the continuously formed film to a fabric gains the strength of the woven fabric without interfering with barrier properties of the film. It enhances the flexibility and resistance to failure from flexing of the total laminated fabric. Because of the absolute fail-safe requirements of these chemical protective suits and for ease of putting the suit on or taking it off, inner layer of film is also used to form a sandwich. This maximizes the flexibility of a given construction with the total plastic film barrier being split into two layers and being easier to flex than one thick layer.

It should be noted that polytetrafluorethylene (TFE) does not fuse. Sheets of TFE are hot pressed from the powder or fiber to form coalescence into sheets or films which have porosity and poor abrasion resistance.

SUMMARY OF THE INVENTION

Briefly, the invention provides a laminated fabric for protective clothing, containers and covers for protection against hazardous liquids, vapors, and is flame retardant. More particularly, the fabric is provided with an inner layer comprising a copolymer of ethylene and vinyl alcohol, an intermediate layer of an abrasion resistant fabric of high tensile fibers and a film layer bonded on the outer surface of said abrasion resistant fabric comprising a fusible or meltable polyhalogenated resin. The ethylene-vinyl alcohol copolymer inner layer can comprise the copolymer itself or it can comprise a layer of the ethylene-vinyl alcohol copolymer qextuded with one or more layers of a polyolefin, for example, polyethylene, polypropylene and the like, an ionomer, ethylene-vinyl alcohol copolymer, and the like.

The invention also relates to protective garments, containers and covers which are fabricated in part from the fabric of the invention.

Other objects and a fuller understanding of the invention will be had by referring to the following description and claims taken in conjunction with the accompanying drawing.

DESCRIPTION OF THE PREFERRED EMBODIMENTS

Figure 1:
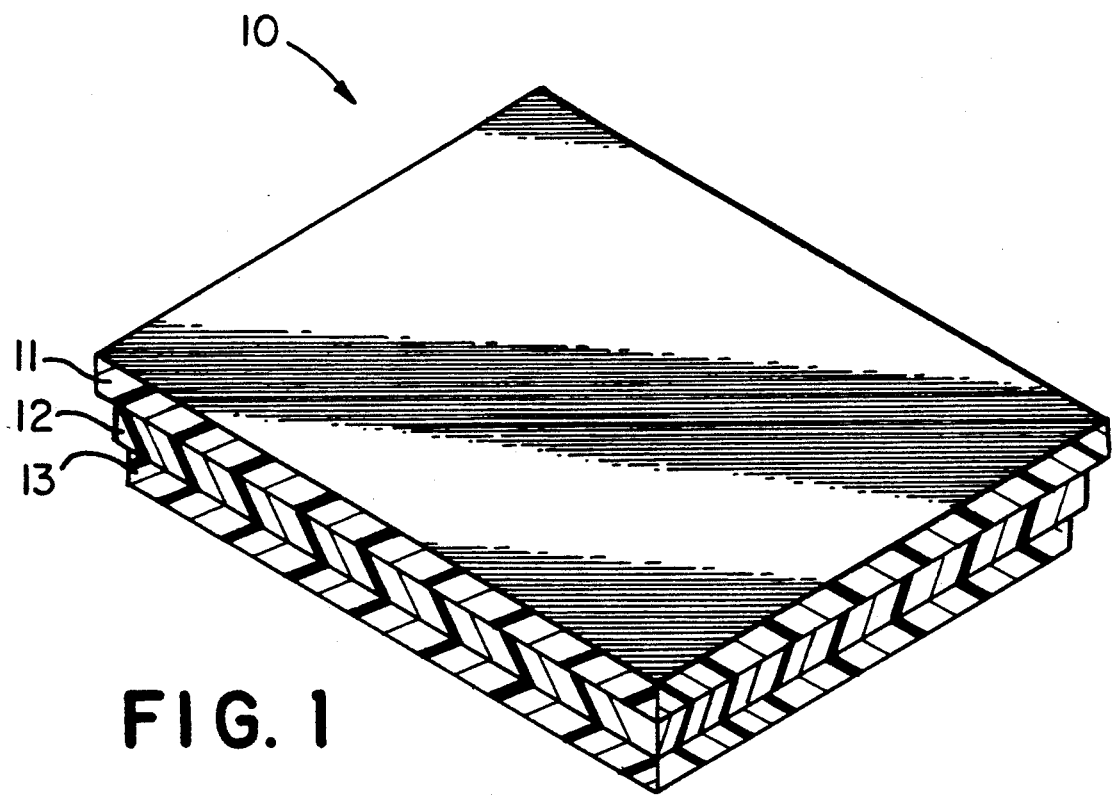
FIG. 1 is an exploded sectional view of a fabric of the invention.

Although specific terms are used in the following description for the sake of clarity, these terms are intended to refer only to the particular structure of the invention selected for illustration in the drawings, and are not intended to define or limit the scope of the invention.

As shown in FIG. 1, there is provided a fabric 10 comprising an outer film layer 11 consisting of a fusible or meltable polyhalogenated resin which is bonded to a fabric layer 12. The fabric layer 12 comprises high tensile fibers. An inner or bottom film layer 13 containing the ethylene-vinyl alcohol copolymer layer is also bonded to the fabric layer 12.

The outer layer 11 and the inner layer 13 may be bonded to the fabric layer 12 by the application of heat and pressure. However, the outer layer 11 is preferably adhesively bonded to the fabric 12 to provide greater flexibility.

Figure 2:
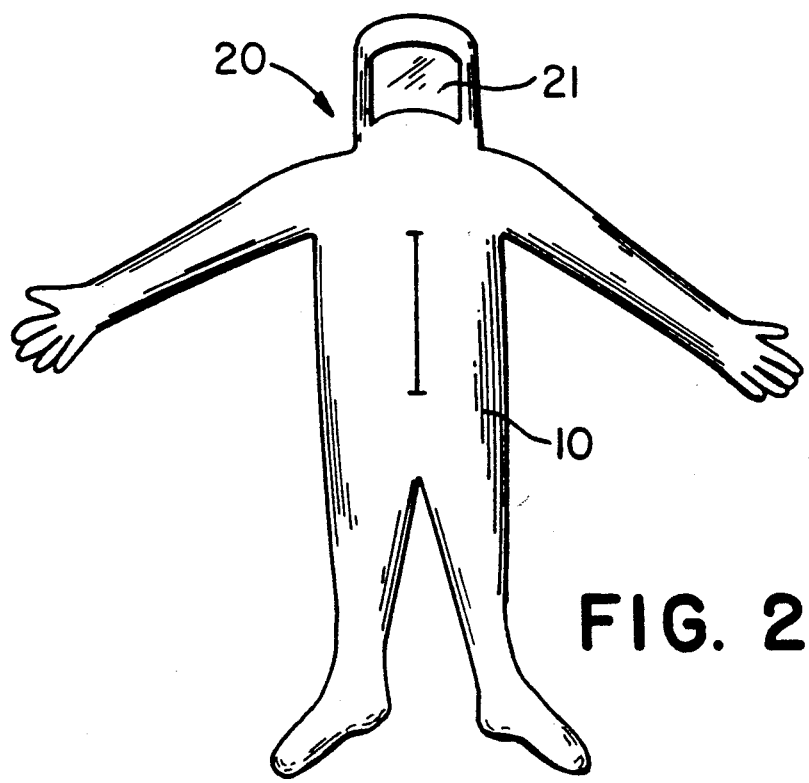
FIG. 2 illustrates a protective garment with the fabric of the invention.

As illustrated in FIG. 2, a protective garment 20 is prepared from the fabric 10 of the invention. The garment 20 is provided with an optically transparent face piece 21. Preferably the face piece 21 is formed from thick films of a polyhalogenated outer film or a film containing a ethylene-vinyl alcohol copolymer layer similar to the film forming the interior of the garment 20. Since the face piece and on the layers of the garment 20 are the same material it is possible to prepare a substantially seamless garment which can be formed by heat sealing. Preferably, the face piece 21 is provided with an outer barrier film such as a Teflon (PFA, FEP), nylon or an ionomer which is optically transparent and inert to many chemicals. Suitable ionomers are described in U.S. Pat. No. 4,799,346, which is herein incorporated by reference.

Preferably, the polyhalogenated resin is a fluorinated ethylene perfluoroalkyl vinyl ether copolymer resin (PFA) or perfluoroethylene perfluorinated propylene copolymer (FEP). Advantageously, the resin is a polymer of the formula:

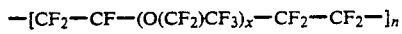

or

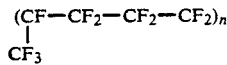

The polyhalogenated ethylene resins are commercially available and are sold by DuPont, Wilmington, Del. under the trademarks TYZEL, TEFLON and TEDLAR, and by Allied Chemical Company, Morristown, N.J. under the trademarks HALAR and ACLOR, and by Pennwalt Corporation, Philadelphia, Pa. under the trademark KYNAR.

Preferably, the halogen components of the polyhalogenated ethylene resin are fluoro and/or chloro. Also, it is critical that the ethylene resin is meltable and film forming. The resins which are meltable between the temperatures of about 100 to 350° C., are particularly suitable for manufacturing reasons.

The thickness of the polyhalogenated ethylene resin films is generally in the range about 10 to 125 micrometers (about 0.4 to 10 mils), preferably about 50 to 125 micrometers. The total thickness of the fabric 10 is generally about 10-30 mils, preferably about 15-20 mils. The ethylene-vinyl alcohol copolymer preferably contains about 20 to 70% vinyl alcohol, although, it can also contain other ionomer residues.

The layers with the ethylene and vinyl alcohol copolymers ranges in thickness of about 0.1 to 2.0 mils and can comprise one or more layers. The overall thickness of these inner films is preferably about 2 to 10 mils depending upon the ultimate use. Generally, the other resin layers are polyethylene, nylon or SURLYN (ionomer) which contain the ethylene-vinyl alcohol copolymer. When the inner layer is used to form the face piece, nylon and SURLYN coextrusions should be used to obtain the best optical clarity.

The high tensile fibers which may be utilized to prepare the fabric layer 12 of the present invention include polyamides such as poly (m-phenylene isophthalamide), poly (p-phenylene terephthalamide (Kevlar), poly (m-phenylene terephthalamide (Nomex); nylon, polyethylene terephthalate (PET) carbonaceous polymeric materials such as described in U.S. Pat. No. 4,837,076, polybenzamidazole, oxidized polyacrylonitrile fibers and blends thereof.

The intermediate fabric 12 may be woven, including e.g. plain and upstop weaves, knitted, non-woven, felted, spun bonded, melt spun or porous fabric.

The intermediate fabric 12 is required to provide flex resistance and tear strength, and to prevent damage to the bottom surface of the inner layer in the event the outer film is punctured to prevent exposure by the wearer to toxic vapors.

The fabric 12 is preferably bonded to the outer film by an adhesive, preferably a flexible adhesive. Preferable adhesive compositions are ethylene/vinyl acetate, urethanes, polyester, and ethylene/acrylic ester copolymers such as described in U.S. Pat. No. 4,322,516, which is incorporated herein by reference.

Although the invention has been described with preferred embodiments, it is to be understood that variations and modifications may be employed without departing from the concept of the invention as defined in the following claims.

What is claimed:

1. A laminated fabric for protective clothing, containers and covers for protection against hazardous liquids and vapors consisting of a layer of an tear resistant fabric of high tensile fibers, an outer film layer bonded to said tear resistant fabric comprising a fusible or meltable polyhalogenated ethylene resin, and an inner film comprising an ethylene-vinyl alcohol copolymer layer bonded to said tear resistant fabric, whereby said laminated fabric prevents the passage of hazardous vapors.

2. The fabric for protective clothing according to claim 1 wherein said polyhalogenated resin comprises a fluorinated ethylene perfluoroalkyl vinyl ether copolymer resin.

3. The fabric for protecting clothing according to claim 1 wherein said polyhalogenated resin comprises a fluorinated ethylene propylene copolymer resin.

4. The fabric for protective clothing according to claim 3 wherein said polymer resin has a melting point between about 175 to 350° C.

5. The fabric for protective clothing according to claim 1 wherein said high tensile fiber is selected from the group consisting of polyethylene terephthalate, poly p-phenylene terephthalamide, poly m-phenylene terephthalamide, carbonaceous polymeric oxidized polyacrylonitrile, nylon and polybenzimidazole.

6. The fabric according to claim 1 comprising a tear resistant fabric sandwiched between a film layer of a polyhalogenated resin film and a film layer of an ethylene-vinyl alcohol copolymer.

7. A fabric for protective clothing, containers and covers for protection against hazardous liquids and vapors consisting of a layer of an abrasion resistant fabric, a first film layer adhesively bonded on one surface of said abrasion resistant fabric, said first film layer comprising a fusible and/or meltable polyhalogenated ethylene resin selected from the group consisting of $$-[CF_2-CF-(O(CF_2)CF_3)_x-CF_2-CF_2-]_n \text{ and}$$

$$(\underset{\underset{CF_3}{|}}{CF}-CF_2-CF_2-CF_2)_n$$

said resin having a melting point between about 175 to 350° C., and a second film layer comprising an ethylene-vinyl alcohol copolymer layer bonded on the other surface of said fabric, whereby said fabric prevents the passage of hazardous vapors.

8. The fabric for protective clothing according to claim 7 wherein said abrasion resistant fabric comprises fibers selected from the group consisting of polyethylene terephthalate, poly p-phenylene terephthalamide, poly m-phenylene terephthalamide, nylon, carbonaceous polymer, polybenzamidazole, and oxidized polyacrylonitrile.

9. A fabric for protective clothing, containers and covers for protective clothing, containers and covers for protection against the penetration of hazardous liquids and vapors comprising a layer of an abrasion resistant fabric comprising high modulus fibers, a top film layer consisting of a polymer of the formula:

$$[CF_2-CF-(O(CF_2)CF_3)-CF_2-CF_2]_n$$

adhesively bonded onto said fabric layer, said polymer having a melting point of about 100 to 350° C., and a bottom film comprising a layer of an ethylene-vinyl alcohol copolymer which is bonded to the bottom of said fabric layer.

10. A protective garment fabricated in part from the fabric according to claim 1.

11. The garment of claim 10 including a face piece comprising an ethylene-vinyl alcohol copolymer.

12. A protective garment fabricated in part from the fabric according to claim 7.

13. A protective garment fabricated in part from the fabric according to claim 9.

14. The protective garment of claim 13 including a face piece comprising a layer of an ethylene-vinyl alcohol copolymer and a layer of an ionomer or nylon.

* * * * *